(12) United States Patent
Adams et al.

(10) Patent No.: US 7,039,650 B2
(45) Date of Patent: May 2, 2006

(54) SYSTEM AND METHOD FOR MAKING MULTIPLE DATABASES APPEAR AS A SINGLE DATABASE

(75) Inventors: Steve Adams, Dublin, OH (US); James Paat, Powell, OH (US); Philip Pointer, Columbus, OH (US)

(73) Assignee: Sypherlink, Inc., Columbus, OH (US)

( * ) Notice: Subject to any disclaimer, the term of this patent is extended or adjusted under 35 U.S.C. 154(b) by 364 days.

(21) Appl. No.: 10/210,038

(22) Filed: Aug. 2, 2002

(65) Prior Publication Data

US 2003/0225780 A1  Dec. 4, 2003

Related U.S. Application Data

(60) Provisional application No. 60/384,101, filed on May 31, 2002.

(51) Int. Cl.
*G06F 17/30* (2006.01)
(52) U.S. Cl. .................................................. 707/102
(58) Field of Classification Search ................. 707/102
See application file for complete search history.

(56) References Cited

U.S. PATENT DOCUMENTS

| | | | | |
|---|---|---|---|---|
| 5,701,400 A | * | 12/1997 | Amado | 706/45 |
| 5,895,467 A | * | 4/1999 | Ubell et al. | 707/9 |
| 5,943,666 A | * | 8/1999 | Kleewein et al. | 707/2 |
| 6,298,342 B1 | * | 10/2001 | Graefe et al. | 707/4 |
| 6,347,313 B1 | * | 2/2002 | Ma et al. | 707/3 |
| 6,523,041 B1 | * | 2/2003 | Morgan et al. | 707/102 |
| 6,691,109 B1 | * | 2/2004 | Bjornson et al. | 707/4 |
| 6,735,598 B1 | * | 5/2004 | Srivastava | 707/103 R |
| 6,801,921 B1 | * | 10/2004 | Tsuchida et al. | 707/204 |
| 2001/0044737 A1 | * | 11/2001 | Halligan et al. | 705/7 |
| 2002/0194187 A1 | * | 12/2002 | McNeil et al. | 707/100 |
| 2002/0194201 A1 | * | 12/2002 | Wilbanks et al. | 707/104.1 |
| 2003/0033290 A1 | * | 2/2003 | Garner et al. | 707/3 |

* cited by examiner

*Primary Examiner*—Wayne Amsbury
(74) *Attorney, Agent, or Firm*—Baker & Hostetler LLP

(57) ABSTRACT

A database merging apparatus includes a database pair generator that creates a database pair from a first database, a probe set generator that creates a database probe set from a second database and a comparator in communication with the database pair generator and the probe set generator. The comparator determines if the database probe set correlates to the database pair. An identifier is in communication with the comparator to identify a correlation between the database pair and the database probe set so that correlating data from the first database and the second database can be accessed if there is a correlation.

37 Claims, 3 Drawing Sheets

SYSTEM AND METHOD FOR MAKING MULTIPLE DATABASES APPEAR AS A SINGLE DATABASE

PRIORITY CLAIM

This application claims priority to provisional U.S. patent applications entitled, System and Method for Making Multiple Databases Appear as a Single Database, filed May 31, 2002, having Ser. No. 60/384,101, the disclosure of which is incorporated herein by reference.

FIELD OF THE INVENTION

The present invention relates generally to databases. More particularly, the present invention relates to relating data in databases to one another.

BACKGROUND OF THE INVENTION

It has been common in the computer industry, more specifically with the management of data, to build relationships between many types of data that a business and its trading partners encounter on a recurring basis. This is certainly a common issue that a business in a growth phase must accommodate, especially when enhancing existing data management systems or when incorporating new data management systems. Tasks associated with these efforts are often referred to as integration or conversion projects.

Examples of when a business might encounter an integration or conversion project include:

Acquiring or merging with another business

Purchase of a new computer application or system that is not readily compatible with existing systems Need to communicate electronic data with a business partner or associate Creating new reports that span business areas or departments The integration or conversion project typically requires domain expertise of source and target systems at the data field level. The expert knowledge helps determine the proper data field mappings required to properly exchange data for integration or communication. These tasks are also referred to as mapping projects. These mapping projects can be described in detail, and the tasks then delegated to other teams not necessarily requiring specific expertise. In any case, these tasks are usually very time and resource intensive.

In the past few years several tools have been brought to market that facilitate these tasks, particularly with graphical user interfaces and simple conversion functions. But the data field mapping remains a manual process, and expert domain knowledge is still required to facilitate the process.

A need exists today to automate the development of field level relationships established between two or more databases, tables, and files, and with domain knowledge somewhat less than that of the level of expert. This automated data mapping must be faster than existing manual methods, and must require fewer resources as well. There should also be a means for verifying the accuracy of the mappings, overriding of some of the mappings if necessary, as well as the addition of relationships known as the result of expert domain knowledge of the data.

The present invention is designed to fulfill the above listed needs. The invention provides a tool that can build field level relationships between two or more disparate databases, tables, and files in an automated fashion, and do so without expert knowledge of the databases, tables, and files.

The foregoing and other objects and advantages will become more apparent when viewed in light of the accompanying drawings and following detailed description.

SUMMARY OF THE INVENTION

It is therefore a feature and advantage of the present invention to provide an intelligent engine that builds field level relationships between disparate databases, tables and files, allowing for a singular and functional view of these relationships.

In one embodiment of the invention a database merging apparatus includes a database pair generator that creates a database pair from a first database, a probe set generator that creates a database probe set from a second database and a comparator in communication with the database pair generator and the probe set generator. The comparator determines if the database probe set correlates to the database pair. An identifier is in communication with the comparator to identify a correlation between the database pair and the database probe set so that correlating data from the first database and the second database can be accessed if there is a correlation.

In another embodiment of the invention, a method for merging two or more databases includes the steps of generating one or more database pairs from a first database, generating a database probe set from a second database and determining if the database pairs correlate to the database probe set. A correlation between the database pairs and the database probe set are identified so that correlating data from the first database and the second database can be accessed if there is a correlation.

In an alternate embodiment of the invention, a system for merging two or more databases includes a means for generating database pairs from a first database, a means for generating a database probe set from a second database and a means for determining if the database pairs correlate to the database probe set. A means for identifying a correlation between said database pairs and said database probe set is provided so that correlating data from the first database and the second database can be accessed if there is a correlation.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Databases, and other sources of data that can be accessed as if they were databases, can be described by four distinct characterizations:

- Structure, which includes tables within the databases and fields within tables
- Data Type of each field
- Relationships of the fields, commonly referred to as referential integrity
- Contents of the fields These characterizations of a database can be extended to span multiple databases using the same analysis that was applied to a single database. And within one large database, there can be many tables partitioned in to groups. These groups are not explicitly or implicitly linked to each other via referential integrity or naming. Instead, relationships must be known via expert domain knowledge, or must be uncovered by in-depth analysis of each table based on type of information and on contents, using naming of fields only as very broad hints.

In the context of this invention, a relationship is where two fields within a database are determined to represent the same entity. A unique element is a field where its only relationship to other data fields is that it appears in the same database row as other data elements.

Figure 1:
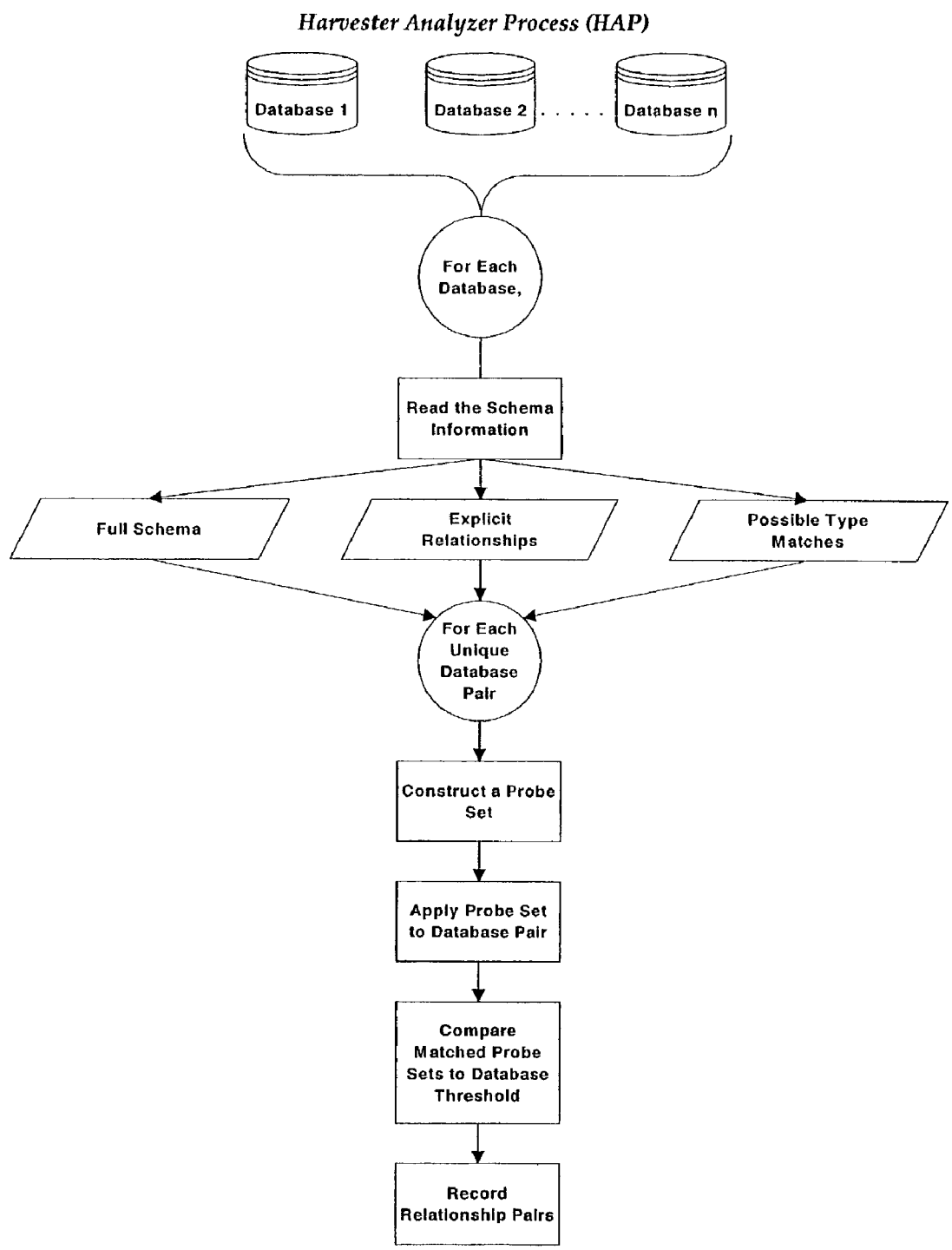
FIG. 1 is a high-level flow chart of a Harvester Analyzer Process (HAP).

FIG. 1 is a flow diagram of the Harvester Analysis Process (HAP). For each of the databases, Database 1 to Database n, Schema Information is created. This can be in the form of Full Schema, Explicit Relationships of Possible match types. Probe sets are then constructed for each of the databases. The probe set can be applied to the database pair to determine if there is a correlation between the probe set and the database pair. This can indicate whether the data for the probe set correlates to the data of the database pair. In some instances if the matched probe sets reaches a threshold a relationship pair is identified and can be recorded so that the correlating data can be linked together and easily accessed.

Database Analysis

The HAP performs an intra-database analysis to find the explicit and implicit relationships between fields. Explicit relationships are determined, where the database structure, itself declared by means of foreign indices, lists the links that exist between tables. This information is obtained directly from the database using Meta data, or "data about data".

The implicit relationships are determined by analyzing the types of fields and the field contents. The analysis of the data types determines the set of possible relationships, and produces a set of pairs to test for commonality. A pair is defined as a table and field combination.

Testing is done by probing the database with known values. Once a pair of fields has been identified, values are fetched from one table and used to probe corresponding fields in the other table. Adjustable heuristics are defined that determine whether a match is found. These heuristics can be processed in one of three strategies:

The first strategy is "all data analysis". This analysis takes a section of one database and compares it to a section of another database. It does this comparison by performing a "closure" of the data. That is, it compares all related data from the section of the first database with all of the data from the section of the second database. When matches are found, they are weighted and then marked as an actual match when certain user settable thresholds are reached. The maximum form of this analysis is to completely compare one database to another.

This heuristic operates as a confidence interval for the data being examined. So, for example, if one field out of twenty in a record matches, then this is a poor fit. However, if eighteen out of twenty match, then it is a good fit.

The second strategy of analysis is "select analysis". Here, a section of a database is probed against all of the second database. When values are found, they are run through the same weighting process as in the all data analysis case. Again, this can be setup to compare all of one database to another.

The last strategy of analysis is "schema based". This is for the case where there is no data in one of the databases being analyzed. Here, matching is based on the names of fields, the type information for the field (e.g., is it character data, a date, a number, etc.). This analysis results in a series of potential matches. Since there is no data to analyze, these results are, at best, approximations. However, the analysis can be useful in the case where there is no data to analyze.

This three-tiered matching is essential. Consider the case where in one table there is a last name, a first name, and a middle initial. In a second table is a last name and a first name. In addition, assume that there are names in each table that do not appear in the other. The intersection of the two sets representing the two tables is the result of interest. The intersection is compared to each table as a percentage of the probe set, not of the total table size. If the matching percentage of the intersection set exceeds a pre-set and configurable value, the entire probe set is considered a match and a relationship is reported.

Several criteria can be set across all of three strategies, when appropriate. These include not checking "flag fields" (fields of type "BIT" and length one), not checking Binary Large OBjects (BLOB) fields, not checking fields that are all zeros or are null (zeros and null can represent uninitialized data). There is also a mechanism to limit the size of the sections of a database that are analyzed. Smaller sections are analyzed faster, but are less accurate. In one embodiment of the invention, a size of around 2,000 can be used to obtain desired results.

Probe Set Selection

Figure 2:
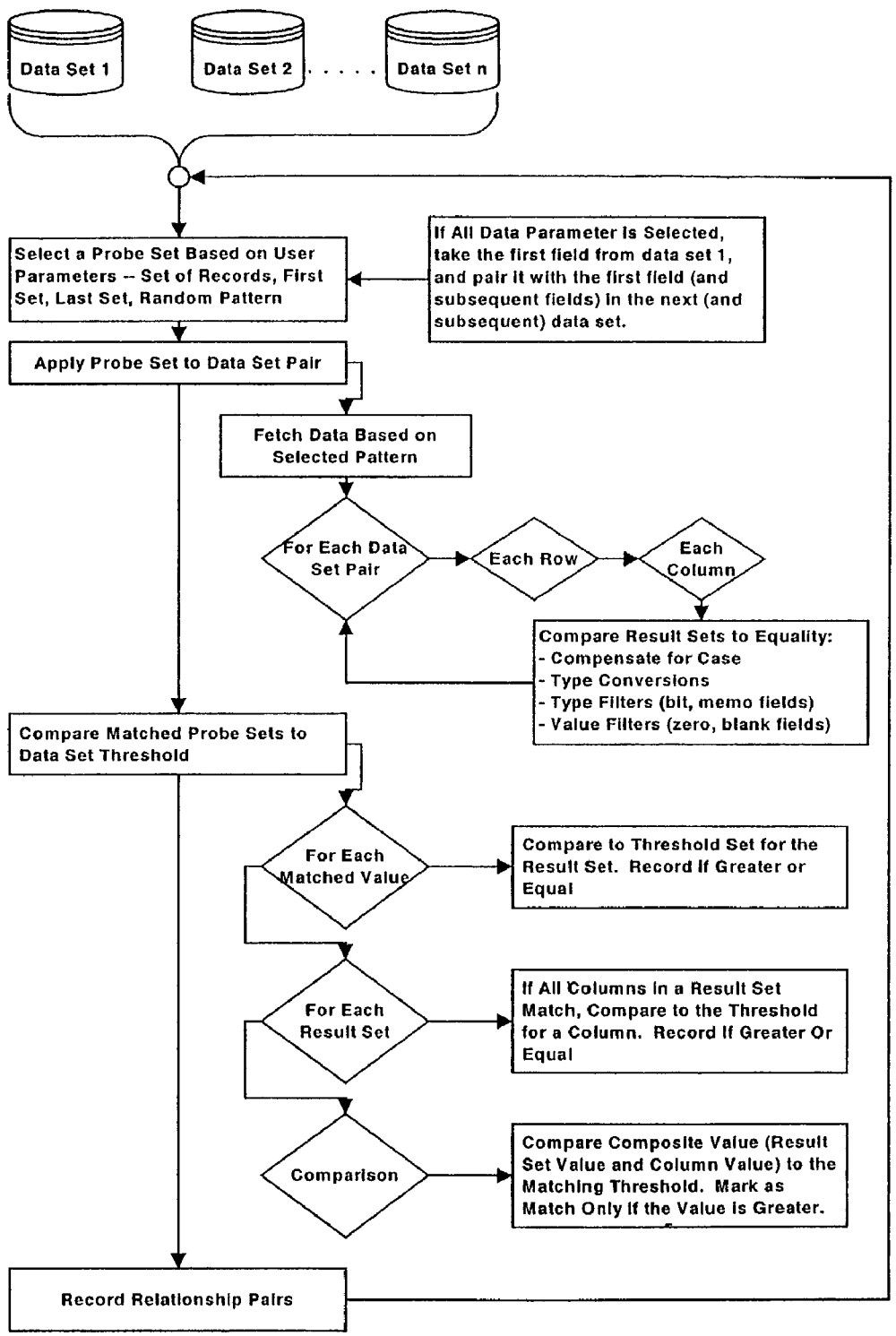
FIG. 2 is a flow chart of a Harvester Probe Set process which shows how two data fields are paired, and then how upon each pair is the application operates.

FIG. 2 illustrates the steps taken in the Harvester probe set process. Probe Sets are a statistical method in which to construct data samples that will be taken from one source, and then used to examine another source. The number of columns in a probe set varies based on the characteristics of the two sources. The number of rows also varies and is based on the sizes of both sources. The goal is to use the minimum number of rows and columns required in order to determine a match.

Probe sets are defined as a retry on error model. A retry on error model is defined as the scenario where more time is invested in the process when no match is found. Similar to exception processing within some computer programming languages, processing proceeds quickly under normal circumstances, but increases when errors (in this case, no matches) occur, and additional time is devoted to discovering alternatives.

Probe sets are constructed in several ways. For small tables, the entire table can be used as a probe set. For larger tables, a subset of the data is used, and selection will range from differing strategies, including the first portion of a table or alternating or randomized record selection. The strategy for probe set selection is normally automated, and is dependent on field characteristic as well as data characteristic. For example, if the data for a particular field is sorted, the application will choose alternating or randomized record selection strategy for the probe set.

A retry mechanism will automatically switch to a different selection strategy when a particular probe set fails. This automated reselection occurs on failure in order to eliminate false negative results.

The selection criteria for probe sets can be specified at run time if defaults are not preferred. By relaxing control over probe set selection criteria, probes are more accurate. By selecting stricter control over probe set selection criteria, the application will run faster.

Results of Analysis

HAP results in three sets of information:
The set of intra-database relationships, also referred to as inner relationships
The set of inter-database relationships, also referred to as outer relationships
A composite schema which represents all of the databases presented for analysis. Unique fields are represented in the schema, and can be logically represented by what remains of the schema when the inner and outer relationships are subtracted.

These three sets are what enable the navigation of the aggregation of databases provided to the Sypherlink Harvester for analysis.

Harvester Runtime Component (HRC)

Figure 3:
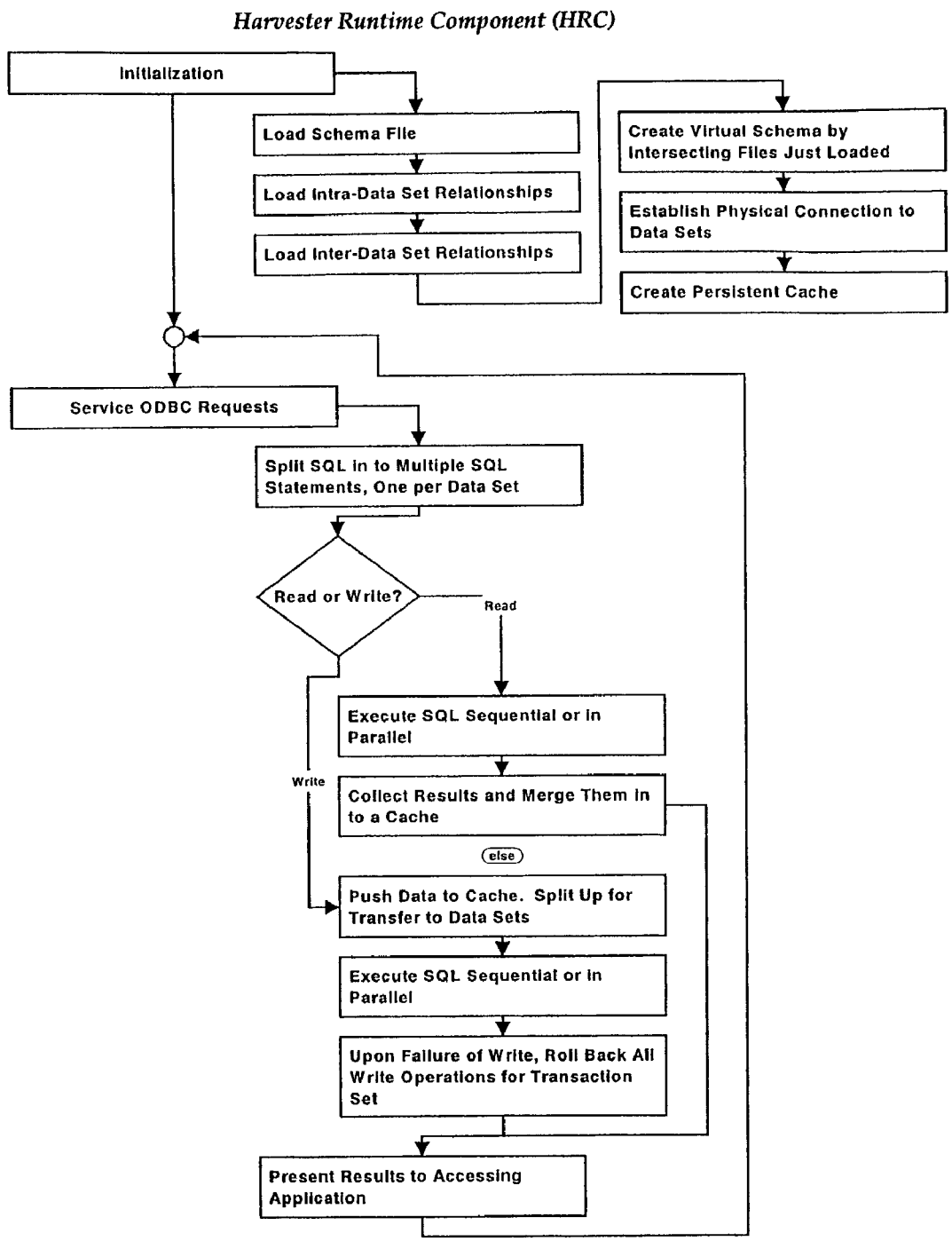
FIG. 3 is a flow chart of a Harvester Runtime Component (HRC), which shows the logic of the runtime component that processes SQL statements for the data sets being accessed by the user.

FIG. 3 illustrates the steps taken in the HRC. The composite schema view is used to drive a special open database control (ODBC) driver that allows third party applications to have read and update access to all the databases as if they are a single database. Navigation within and between the databases is completely transparent to the accessing application, and is accomplished by using the composite schema, the inner relationships and the outer relationships. Queries that are sent in to this ODBC driver are analyzed and then split in to a number of separate queries, each of which access one of the original databases. Merging of the information from multiple database occurs in the ODBC driver itself.

It is not necessary to run the Harvester Analyzer (HAP) prior to each start of the run time component of Harvester; ideally, the HAP will only be run once, or again if any of the organization of the source data sets are changed in a material way.

In practice, it is anticipated that only a structural change to a source data set would constitute a material change, and then require another run of the HAP.

When an instance of the Harvester Runtime Component (HRC) is started, the three outputs from the HAP are loaded. As mentioned above, these components are the schema, intra- and inter-relationships. A connection to each physical data set is initiated, and a persistent cache is created using local ODBC connections. The HRC is now ready to process ODBC requests as indicated by the ODBC application programmers interface (API).

Within the HRC where structure query language (SQL) commands are to be processed for read operations, the application will
  Split each SQL sentence in to multiple SQL statements, one for each data set.
  Execute transactional SQL statements, sequentially or in parallel depending on the capabilities of the run time environment.
  Collect the results and merge them in to a cache.
  Present the result sets back to the accessing application.
  When SQL commands are to be processed for write operations, the application will
  Split each SQL sentence in to multiple SQL statements, one for each data set.
  Data is pushed in to the cache, where it is split up to be transferred to separate databases.
  Execute transactional SQL statements, sequentially or in parallel depending on the capabilities of the run time environment.
  Upon failure of a write operation to any data set, roll back all write operations for this transaction set.
  Present the result back to the accessing application.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A database correlating apparatus that is configured to merge distinct databases such that the databases appear to an accessor as a single database comprising:
  a database pair generator that creates an initial database pair from a first non-merged database;
  a probe set generator that creates a database probe set from a second non-merged database;
  a comparator in communication with said database pair generator and said probe set generator, said comparator determining if said database probe set correlates to said database pair; and
  an identifier in communication with said comparator to identify a correlation between said database pair and said database probe set so that correlating data from said first database and said second database can be accessed if there is a correlation such that data from the first and second non-merged databases are accessibly simultaneously.

2. The apparatus as recited in claim 1 wherein said database pair comprises a table and field combination from said first database.

3. The apparatus as recited in claim 1 wherein said database pair comprises table and field combinations from a section of said first database.

4. The apparatus as recited in claim 1 wherein said database pair comprises table and field combinations from said first database in its entirety.

5. The database merging apparatus as recited in claim 1 wherein said database pair comprises field and empty table combinations from said first database.

6. The apparatus as recited in claim 1 wherein said database probe set is derived from a section of said second database.

7. The apparatus as recited in claim 1 wherein said database probe set is derived from said second database in its entirety.

8. The apparatus as recited in claim 1 wherein said database probe set is derived from one or more fields of said second database.

9. The apparatus as recited in claim 1 further comprising:
an input in communication with said first and second database, said input receiving commands;
a splitter in communication with said input, said splitter splitting said commands into multiple commands; and
a collector in communication with said splitter, said collector using said commands to access said databases based on the correlation's identified by said identifier.

10. The apparatus as recited in claim 9 wherein said collector reads data from said databases based on the correlation's identified by said identifier.

11. The apparatus as recited in claim 9 wherein said collector writes data to said databases based on the correlation's identified by said identifier.

12. The apparatus as recited in claim 11 further comprising a retriever in communication with said databases wherein if there is a write failure to a database said retriever rolls back all write operations made to other databases.

13. The apparatus as in claim 1, wherein successive database probe sets are generated until the correlation data between the first and second non-merged databases is identified.

14. A computer readable medium containing executable code for correlating two or more databases comprising:
generating a database pair from a first non-merged database;
generating an initial database probe set from a second non-merged database;
determining if said database pairs correlate to said database probe set;
identifying a correlation between said database pairs and said database probe set;
granting access simultaneously to the first and second non-merged databases upon identifying the correlation; and
in response to no correlation from the initial database probe set, generating successive database probe sets until the correlation is determined.

15. The computer readable medium as recited in claim 14 wherein said step of generating one or more database pairs comprises the step of generating a table and field combination from said first database to form said database pair.

16. The computer readable medium as recited in claim 14 wherein said step of generating one or more database pairs further comprises the step of generating table and field combinations from a section of said first database to form said database pairs.

17. The computer readable medium as recited in claim 14 wherein said step of generating a database pair further comprises the step of generating table and field combinations from said first database in its entirety to form said database pairs.

18. The computer readable medium as recited in claim 14 wherein said step of generating a database pair further comprises the step of generating field and empty table combinations from said second database to form said database pairs.

19. The computer readable medium as recited in claim 14 wherein said step of generating said database probe set further comprises the step of generating said database probe set from a section of said second database.

20. The computer readable medium as recited in claim 14 wherein said step of generating said database probe set further comprises the step of generating said database probe set from said second database in its entirety.

21. The computer readable medium as recited in claim 14 wherein said step of generating said database probe set further comprises the step of generating said database probe set from one or more fields of said second database.

22. The computer readable medium as recited in claim 14 further comprising:
receiving commands;
splitting said commands into multiple commands; and
using said commands to access said databases based on the correlations identified by said identifier.

23. The computer readable medium as recited in claim 22 wherein data is read from said databases based on identified correlations.

24. The computer readable medium as recited in claim 22 wherein data is written to said databases based on identified correlations.

25. The computer readable medium as recited in claim 24 wherein if there is a write failure to a database all write operations made to other databases are rolled back.

26. A system for correlating two or more databases comprising:
a means for generating a pair from a first database;
a means for generating an initial database probe set from a second database;
a means for determining if said database pairs correlate to said database probe set;
a means for identifying a correlation between said database pairs and said database probe set so that correlating data from said first database and said second database can be accessed if there is a correlation; and
a means for generating successive database probe sets until the correlation is determined.

27. The system as recited in claim 26 wherein said means for generating one or more database pairs further comprises a means for generating a table and field combination from said first database to form said database pair.

28. The system as recited in claim 26 wherein said means for generating one or more database pairs further comprises a means for generating table and field combinations from a section of said first database to form said database pairs.

29. The system as recited in claim 26 wherein said means for generating a database pair further comprises a means for generating table and field combinations from said first database in its entirety to form said database pair.

30. The system as recited in claim 26 wherein said means for generating a database pair further comprises a means for generating field and empty table combinations from said second database to form said database pair.

31. The system as recited in claim 26 wherein said means for generating said database probe set further comprises means for generating said database probe set from a section of said second database.

32. The system as recited in claim 26 wherein said means for generating said database probe set further comprises a means for generating said database probe set from said second database in its entirety.

33. The system as recited in claim 26 wherein said means for generating said database probe set further comprises a means for generating said database probe set from one or more fields of said second database.

34. The system as recited in claim 26 further comprising the steps of:
   means for receiving commands;
   means for splitting said commands into multiple commands; and means for using said commands to access said databases based on identified correlations.

35. The system as recited in claim 34 further comprising a means for reading data from said databases based on identified correlation's.

36. The system as recited in claim 34 further comprising a means for writing data to said databases based on identified correlation's.

37. The system as recited in claim 36 further comprising a means for rolling back all write operations if there is a write failure to a database.

* * * * *